US007228525B2

(12) United States Patent
Chadzelek

(10) Patent No.: US 7,228,525 B2
(45) Date of Patent: Jun. 5, 2007

(54) GENERIC RENDERING FRAMEWORK

(75) Inventor: Thomas Chadzelek, Quierschied (DE)

(73) Assignee: SAP AG, Waldorf ( * ) Notice: Subject to any disclaimer, the term of this patent is extended or adjusted under 35 U.S.C. 154(b) by 628 days.

(21) Appl. No.: 10/367,108

(22) Filed: Feb. 14, 2003

(65) Prior Publication Data

US 2004/0160461 A1    Aug. 19, 2004

(51) Int. Cl.
G06F 9/44 (2006.01)

(52) U.S. Cl. .................................. 717/106; 717/108

(58) Field of Classification Search ........ 717/104–108; 709/231; 715/502, 517; 345/619; 386/52
See application file for complete search history.

(56) References Cited

U.S. PATENT DOCUMENTS

| | | | | |
|---|---|---|---|---|
| 4,885,688 | A | * | 12/1989 | Crawford ..................... 345/427 |
| 5,251,296 | A | * | 10/1993 | Rhoden et al. ............. 345/564 |
| 5,428,722 | A | * | 6/1995 | Marsh et al. ................ 345/619 |
| 5,481,669 | A | * | 1/1996 | Poulton et al. ............. 345/505 |
| 5,530,799 | A | * | 6/1996 | Marsh et al. ................ 345/557 |
| 5,986,667 | A | * | 11/1999 | Jevans .......................... 345/619 |
| 6,631,498 | B1 | * | 10/2003 | McCauley et al. .......... 715/517 |
| 6,708,217 | B1 | * | 3/2004 | Colson et al. ............... 709/231 |
| 6,816,883 | B2 | * | 11/2004 | Baumeister et al. ........ 709/203 |
| 6,853,377 | B2 | * | 2/2005 | Pharr .......................... 345/426 |
| 6,954,581 | B2 | * | 10/2005 | Miller et al. .................. 386/52 |

OTHER PUBLICATIONS

Peter Kipfer et al., "Transparent Distributed Processing For Rendering", Oct. 1999, ACM Press, 1999 IEEE, p. 39-46.*
Marcio S. Pinho, et al., "Cooperative Object Manipulation in Immersive Virtual Environments: Framework and Techniques", Nov. 2002, ACM Press, p. 171-178.*
Abrams, Mark, et al., "UIML: An XML Language for Building Device-Independent User Interfaces," Dec. 1999, retrieved from the Internet on May 17, 2004, at http://www.harmonia.com/resources/papers/xml99Final.pdf, XP002280477, 15 pgs.
Abrams, Marc, et al., "User Interface Markup Language (UIML) Specification, Version 3.0," Feb. 8, 2002, retrieved from the Internet on May 18, 2002, at http://www.uiml.org/specs/docs/uiml30-revised02-12-02.pdf, XP002280679, 116 pgs.
Ali, Mir Farooq, et al., "Building Multi-Platform User Interfaces with UML," Nov. 9, 2001, retrieved from the Internet on May 17, 2004, at http://arxiv.org/ftp/cs/papers/0111/0111024.pdf, XP002280476, XP002280477, XP002280490, 12 pgs.
"Computer Science, abstract," Arxiv.org E-Print Archive, retrieved from the Internet on May 17, 2004, at http://arxiv.org/abs/cs.HC/0111024, XP002280478, 1 pg.
Kagle, Kurt, et al., "Professional XSL," 2001, Wrox Press Ltd., Arden House, Birmingham, UK, XP002281359, p. 742.

(Continued)

Primary Examiner—Wei Zhen
Assistant Examiner—Anna Deng
(74) Attorney, Agent, or Firm—Finnegan, Henderson, Farabow, Garrett & Dunner, L.L.P.

(57) ABSTRACT

Methods and apparatus, including computer program products, for rendering objects. According to one aspect, a program has instructions to receive at run time, in a render manager, a request for rendering a first object and an output destination for rendering the first object, which is an object in a graph of objects; instructions to select a first renderer appropriate to the object and the output destination; and instructions to invoke the selected first renderer to render the first object. Advantageous implementations include instructions in the selected first renderer to call back the render manager when the selected first renderer encounters a second object to be rendered in rendering the first object, where the second object cannot be rendered by the selected renderer; and instructions in the render manager to select and use a second renderer to render the second object.

6 Claims, 6 Drawing Sheets

OTHER PUBLICATIONS

Levine, John R., "Linkers & Loaders," 2000, Morgan Kaufmann Publishers, San Francisco, CA, XP002283283, p. 48.

Phanouriou, Constantinos, "UIML: A Device-Independent User Interface Markup Language," Virginia Polytechnic Institute and State University, Sep. 26, 2000, retrieved from the Internet on May 17, 2004, at http://scholar.lib.vt.edu/theses/available/etd-08122000-19510051/unrestricted/PhanouriouETD.pdf, XP002280491, 172 pgs.

Phanouriou, Constantinos, "User Interface Markup Language (UIML) Draft Specification, Version 2.0a," Jan. 17, 2000, retrieved from the Internet on May 17, 2004, at http://www.uiml.org/specs/docs/uiml20-17Jan00.pdf, XP002280490, 64 pgs.

* cited by examiner

GENERIC RENDERING FRAMEWORK

BACKGROUND

The present invention relates to data processing by digital computer, and more particularly to rendering a graph of objects of existing classes.

For the purposes of this invention, rendering an object includes any transformation of an object into a different representation of the object. The different representation of the object can include a visual representation of the object that can be displayed on a screen. Rendering an object can also include transforming the object to produce an HTML document or an XML description of the object. It is possible to have many renderers for the same object, each renderer transforming the object to a different representation of the object. For example, the data contained in an object can be rendered as text displayed on the screen, as an HTML file, or as an XML file.

The need to separate an object from a visual representation of the object has been recognized in the design of applications that display objects on a screen. Such applications can be required to display a number of different visual representation of the same object. In an interactive visual application, including graphical user interface (GUI) components, any change in the object caused by user interaction with one visual representation of the object needs to be communicated to other visual representations of the object. It can also be desirable to have the ability to add new visual representations for an existing object without making significant changes to the implementation of the object itself or to existing renderers for that object. These objectives can be met by partitioning the visual applications such that there is some separation between the data contained in the object and the visual representation of the object.

The model-view-controller (MVC) architecture, illustrated in FIG. 1, represents one of the approaches for separating the data contained in an object from other aspects of the visual application. The MVC architecture breaks GUI components, that are part of a visual application, into three separate parts—a model 100, a view 105, and a controller 110. The model encompasses the state data for each component. There are different models for different classes of components. The view is the visual representation of the data. The view determines the visual appearance of the component on the screen. The controller is the portion of the user interface that dictates how the component interacts with events. The controller takes user input on the view and decides how each component will react to the event.

In the MVC architecture illustrated in FIG. 1, each of the three components—the model, the view, and the controller—requires the services of another element to keep itself continually updated. The view must obtain the data from the model in order to display the component on the screen. The view monitors the user events and determines if the component associated with the view is the recipient of user events. The view also communicates the user events directed at the component to the controller. The controller receives the user events from the view and determines the appropriate response. The controller's response to the user events may include modifying the state data in the model. The controller communicates any required changes to the state data to the model. The visual representation of the component is updated in response to the user event when the model passes the new state data to the view for display.

FIG. 2 illustrates another approach for separating an object from visual representations of that object that is used by Java™ Swing. Swing uses a simplified variant of the MVC design, called the model-delegate. Swing combines the view 215 and the controller 220 for the object into a single element, known as the UI-delegate 205, that draws the component to the screen and handles GUI events. Each Swing component 200 contains a model 210 and a UI-delegate. The model is responsible for maintaining information about the component's state. The UI-delegate is responsible for maintaining information about how to draw the component on the screen. In addition, the UI-delegate reacts to various events, including user interaction with the view, that propagate through the component. Separating the UI-delegate from the model can permit the user to select different views for the same component without changing the data contained in the model.

A model in Swing has no intrinsic knowledge of the view that represents it. A model only has a set of listeners interested in knowing when the state of the model has changed. Swing uses the separation between the model and the UI-delegate to support the pluggable look-and-feel (PLAF) architecture. The Swing toolkit provides a default look-and-feel. An application can override the default look-and-feel to dictate a particular look-and-feel. A Swing component that is displayed using the pluggable look-and-feel API is aware of the fact that it is being displayed and implements special hooks required by the look-and-feel API. Each Swing component that has a specific look-and-feel behavior defines an abstract class to represent its UI delegate. A particular look-and-feel is installed for a component by creating a UI delegate and setting it as the "UI" property for the component. Each component also provides a method which creates and sets a UI delegate for the default look-and-feel.

SUMMARY OF THE INVENTION

The present invention provides methods and apparatus, including computer program products, for rendering a graph of objects of existing classes.

In general, in one aspect, the invention provides methods and apparatus, including computer program products, for rendering a graph of objects of existing classes. A program according to this aspect has instructions operable to receive a request for rendering a first object and an output destination for rendering a first object, the first object being an object in a graph of objects, the request for rendering being received in a render manager at run time; instructions to select a first renderer for the first object that is appropriate to the object and the output destination; and instructions to invoke the selected first renderer to render the first object.

Advantageous implementations of the invention include one or more of the following features. The selected first renderer has instructions to call back the render manager when the selected first renderer encounters a second object to be rendered in rendering the first object, where the second object cannot be rendered by the selected renderer itself; and the render manager has instructions to select a second renderer to render the second object and invoke the selected second renderer to render the second object. The render manager and the selected first and second renderers operate from outside on the objects to be rendered. The objects to be rendered do not depend in their programming on the renderers managed by the render manager in any way.

The invention can be implemented to realize one or more of the following advantages. The rendering framework oper ates from outside on the objects to be rendered. New renderers may be written for a new representation and attached to existing objects by means of a render manager. The existing objects do not have to be modified when a new way of rendering is needed. The objects to be rendered do not depend on the renderers in any way. The objects to be rendered are not modified when a renderer is written. New renderers can be added and existing renderers can be removed without modifying the objects to be rendered.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
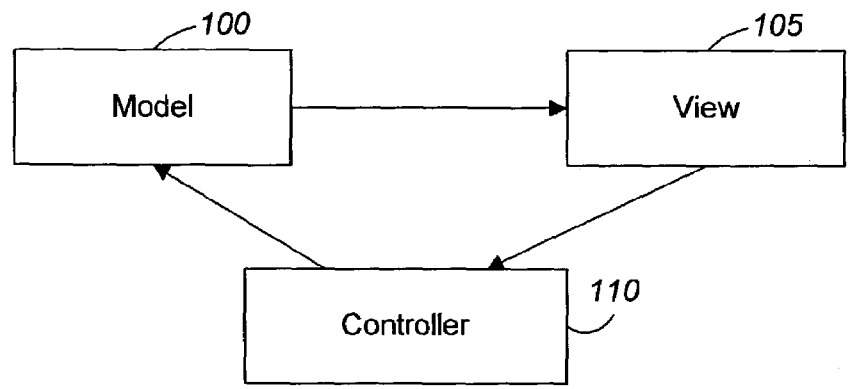
FIG. 1 is an illustration of the model-view-controller architecture.
Figure 2:
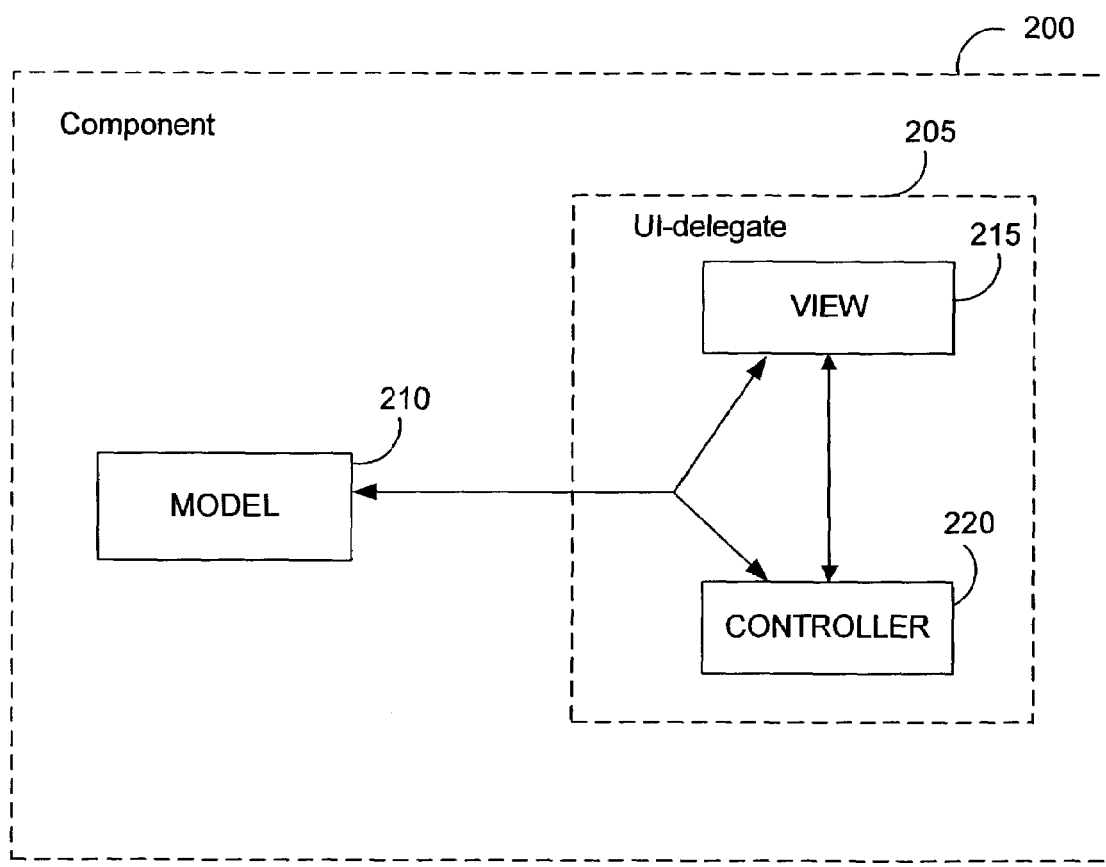
FIG. 2 illustrates the UI-delegate approach used by Java Swing.
Figure 3:
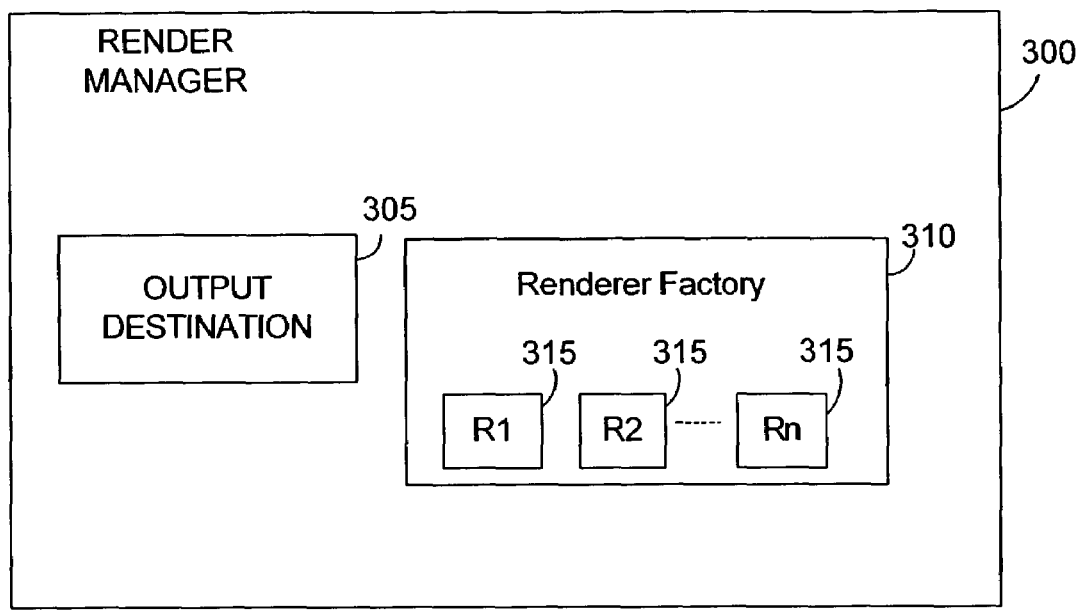
FIG. 3 illustrates the components of a rendering framework in accordance with the invention.

FIG. 3 illustrates the components of a rendering framework that can be used to render a collection of objects. The rendering framework includes a render manager (300). The render manager includes an output destination (305) and a renderer factory (310). The output destination specifies the destination for the output of the renderer. The renderer factory includes renderers (315) for the objects contained in the collection of objects. A renderer knows how to render a certain class of renderable objects with the help of the render manager. In order to be rendered to the output destination, each renderable object must have a corresponding renderer in the renderer factory.

Figure 4:
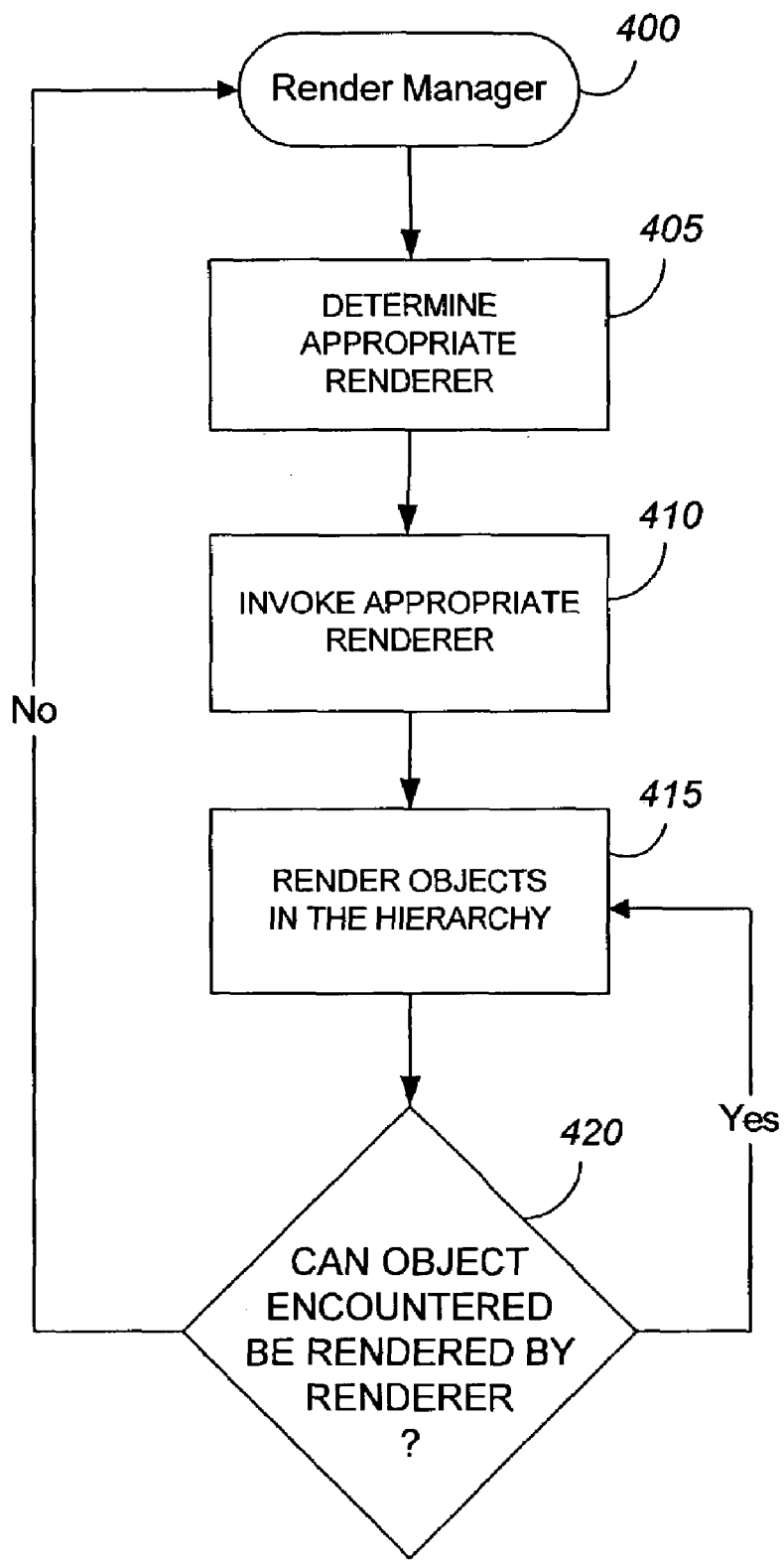
FIG. 4 is a flow diagram for an implementation of a render manager.

FIG. 4 is a flow diagram for an implementation of a render manager of the framework. The render manager (400) is the entry point that is called whenever an object in the collection of objects is to be rendered. The render manager knows where the output should be written and how to delegate the rendering of the renderable object to a corresponding renderer. The render manager determines the appropriate renderer for the object (step 405) and invokes the renderer for the object (step 410). The renderer renders the objects in the collection of objects (step 415) and calls render manager whenever it encounters an object that it cannot render (step 420).

The rendering framework operates from outside on the renderable objects to be rendered. The renderable objects are not aware of the fact that they are being rendered. The implementation of the renderable objects does not contain any special features to support a renderer for the object. The objects become renderable when a renderer is associated with them using the render manager.

Figure 5:
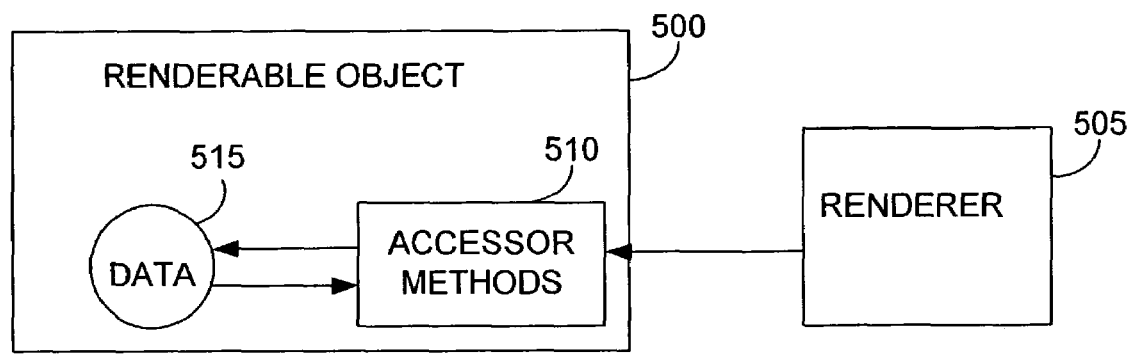
FIG. 5 illustrates the interface between the renderable object and the renderer.

FIG. 5 illustrates the interface between the renderable object (500) and the renderer (505) associated with the object. The renderable objects are only required to provide accessor methods (510) to access the data (515) contained in the object. The renderer uses the accessor methods associated with the object, during the rendering process, to access the data associated with the object.

The rendering framework can be used to provide different representations of an object without having to modify the object. A new representation can be provided for the object by providing a new renderer for the object. The new renderer is added to the renderer factory. The new renderer is associated with the object using the render manager.

Figure 6:
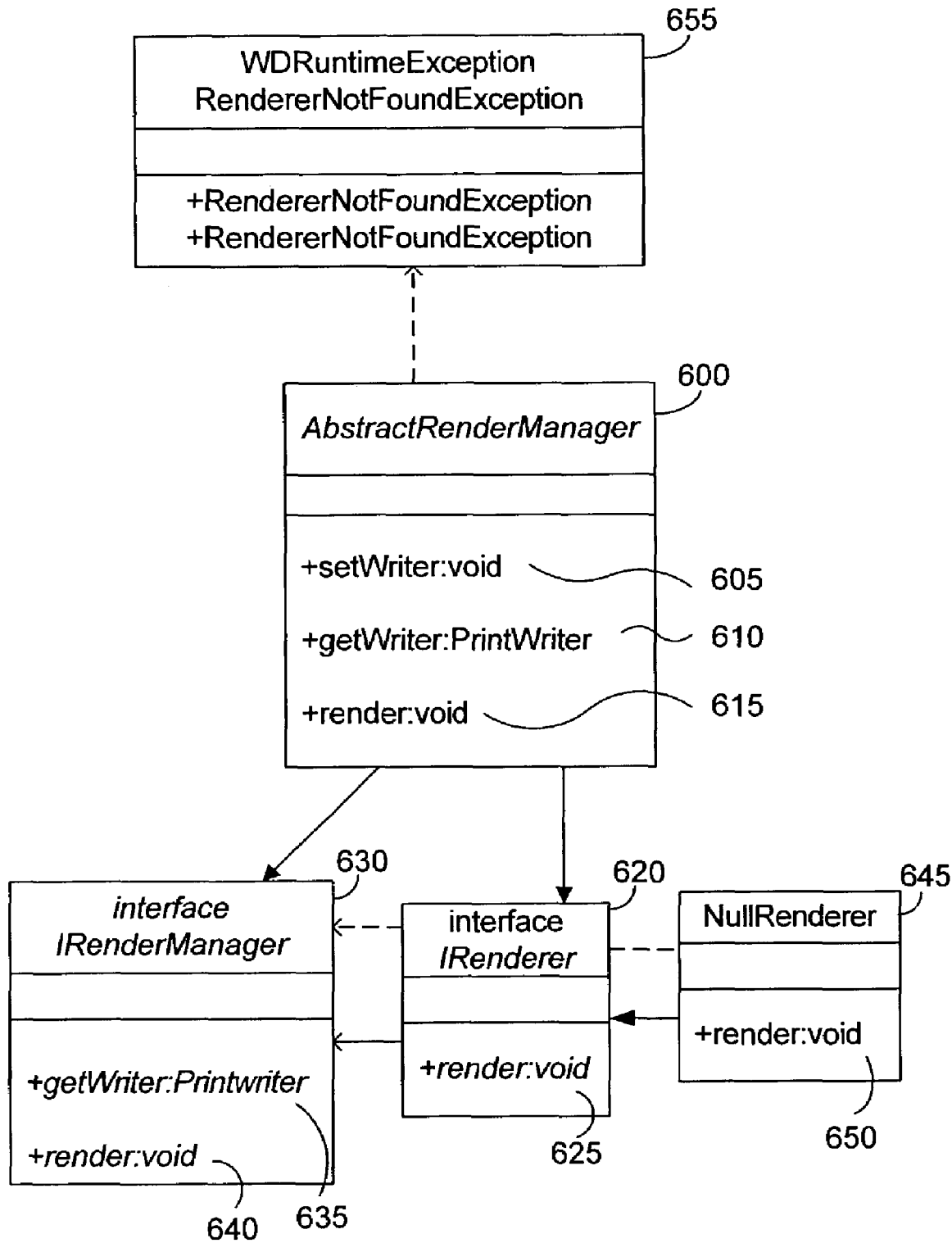
FIG. 6 illustrates an implementation of a base class for the render manager.

FIG. 6 illustrates an exemplary implementation of the rendering framework. The rendering framework includes AbstractRenderManager 600, a common base class for render managers. AbstractRenderManager 600 can store the output destination for the rendering framework, and it can include a cache of renderer instances for a renderable class. AbstractRenderManager 600 can also implement a simple reuse of renderer instances for each renderable class to allow the use of a single renderer to render several objects of the same class. AbstractRenderManager 600 includes a method setWriter 605 that is used to set the output destination for the renderer and a method getWriter 610 that is used to determine the current output destination of the renderer. AbstractRenderManager 600 also implements a method render 615 for rendering objects. AbstractRenderManager 600 depends on a common interface to all renderers, IRenderer 620, and implements a common interface for all render managers, IRenderManager 630. The interfaces IRenderer 620 and IRenderManager 630 are used to render the object with the help of the render manager 600, and direct the output to the output destination of the render manager 600. The interface IRenderer 620 includes a method render 625 that is used to render objects. The method render 625 is called by the render manager when it delegates rendering to a certain renderer. The interface IRenderManager 630 also implements a method render 640 that is used to render objects. The method render 640 is called either from the outside to trigger rendering of a hierarchy of objects or by a certain renderer when it delegates rendering of related objects in the hierarchy back to the manager ("no" branch of decision step 420, FIG. 4). The interface IRenderManager 630 includes a method getWriter 635 that is used to obtain the current output destination from the render manager 600. The implementation of the rendering framework includes a renderer that does nothing, NullRenderer 645, and an exception to indicate that no renderer could be found, WDRuntimeException 655. The NullRenderer 645 includes a method render 650 that renders a null object by doing nothing.

Figure 7:
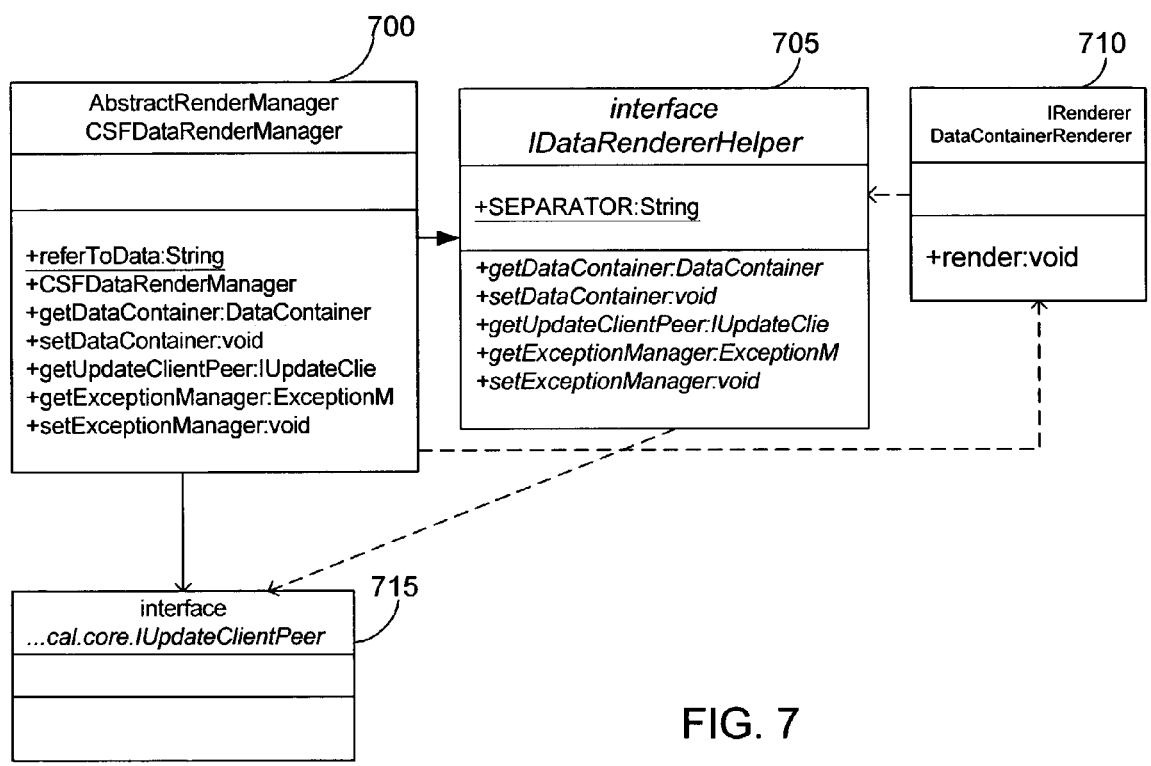
FIG. 7 illustrates an implementation for renderers that require additional information.

FIG. 7 illustrates an exemplary implementation of the rendering framework where the renderer needs additional information, not provided by the accessor methods 510 (FIG. 5), to render the object. The accessor methods required to obtain the additional information can be defined in an interface, IDataRendererHelper 705. The concrete render manager for the class CSFDataRenderManager 700 can implement the interface defined in IDataRendererHelper. The renderer for the object, DataContainerRenderer 710, can obtain the additional information by casting its render manager to the interface. This decouples renderers from the concrete implementation of their manager. The renderers only need to know an interface.

Figure 8:
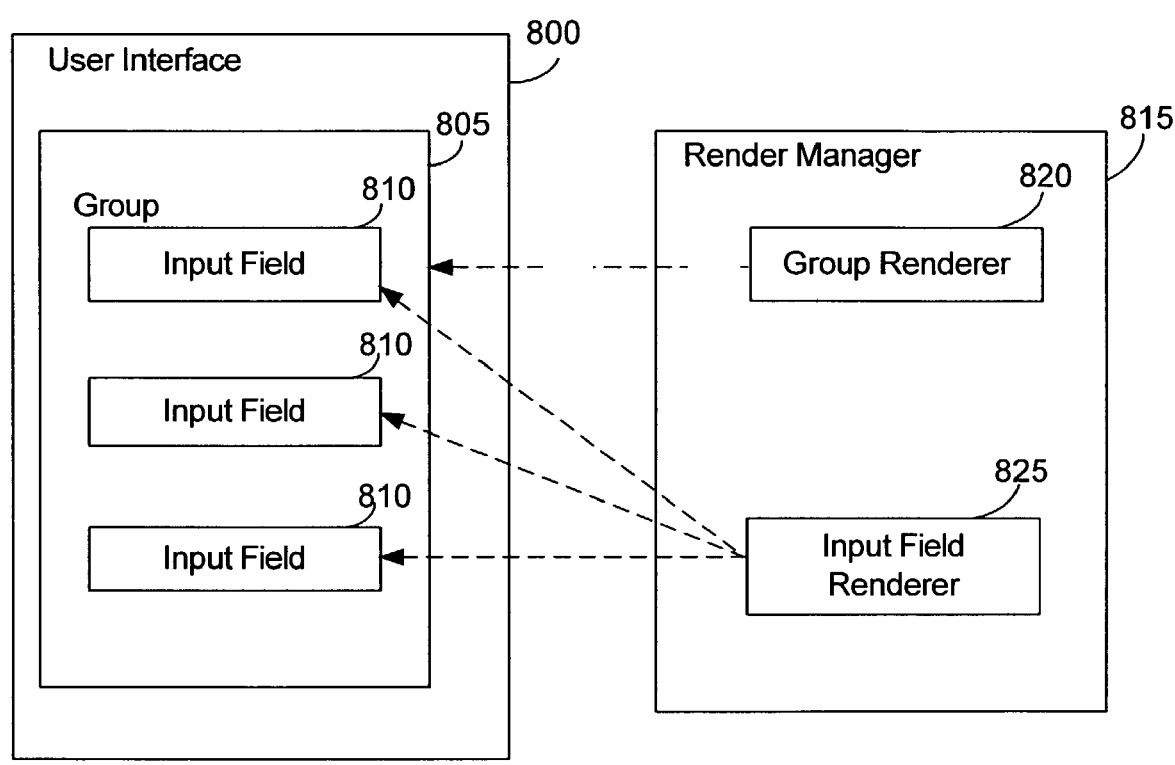
FIG. 8 illustrates an example of a user interface that can be rendered using the disclosed methods.

FIG. 8 illustrates an example of a user interface (UI) that can be rendered using the disclosed methods. The user interface 800 contains user interface elements Group 805 and InputField 810. The element Group can contain one or more InputField elements. The concrete render manager for the user interface, RenderManager 815, includes renderers GroupRenderer 820 and InputFieldRenderer 825. The GroupRenderer accesses the data contained in Group using the accessor methods provided by Group. GroupRenderer can render Group by writing the representation of Group to the render manager's output destination. GroupRenderer also knows that Group contains other UI elements, i.e. InputField, and it can delegate the rendering of these other UI elements to the render manager. The render manager in turn can call InputFieldRenderer to render the instances of InputField.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer implemented method, comprising:
   receiving at run time in a render manager a request for rendering a first object and an output destination for rendering the first object, the first object being an object in a graph of objects, and wherein the request does not specify which of a plurality of renderers should be used in rendering the first object;
   determining, by the render manager, a first renderer for the first object that is appropriate to the first object and the output destination, the determination being made after receiving the request; and
   invoking the selected first renderer to render the first object;
   calling, by the selected first renderer, the render manager when the selected first renderer encounters a second object to be rendered in rendering the first object, where the second object cannot be rendered by the selected first renderer itself;
   selecting, by the render manager, a second renderer to render the second object; and
   invoking the selected second renderer to render the second object.

2. The method of claim 1, wherein the render manager and the selected first and second renderers operate from outside on the objects to be rendered.

3. The method of claim 1, wherein the objects to be rendered do not depend in their programming on the renderers managed by the render manager.

4. A computer readable medium, tangibly comprising program code instructions which, when executed in a processor, perform a method comprising:
   establishing a rendering framework, the rendering framework comprising a render manager and multiple renderers, the render manager comprising instructions for:
   receiving at run time a request for rendering a first object and an output destination for rendering the first object, the first object being an object in a graph of objects, and wherein the request does not specify which of a plurality of renderers should be used in rendering the first object;

determining, by the render manager, a first renderer for the first object that is appropriate to the first object and the output destination, the determination being made after receiving the request; and invoking the selected first renderer to render the first object;

calling, by the selected first renderer, the render manager when the selected first renderer encounters a second object to be rendered in rendering the first object, where the second object cannot be rendered by the selected first renderer itself;

selecting, by the render manager, a second, renderer to render the second object; and invoking the selected second renderer to render the second object.

5. The computer readable medium of claim 4, wherein the render manager and the selected first and second renderers operate from outside on the objects to be rendered.

6. The computer readable medium of claim 4, wherein the objects to be rendered do not depend in their programming on the renderers managed by the render manager.

* * * * *